US008514719B2

(12) United States Patent
Seno (10) Patent No.: US 8,514,719 B2
(45) Date of Patent: Aug. 20, 2013

(54) GUIDANCE CONFIRMATION APPARATUS AND METHOD

(75) Inventor: Hirofumi Seno, Tokyo (JP)

(73) Assignee: NEC Corporation, Tokyo (JP)

( * ) Notice: Subject to any disclaimer, the term of this patent is extended or adjusted under 35 U.S.C. 154(b) by 1137 days.

(21) Appl. No.: 12/275,454

(22) Filed: Nov. 21, 2008

(65) Prior Publication Data

US 2009/0122792 A1 May 14, 2009

(30) Foreign Application Priority Data

Dec. 11, 2007 (JP) .................................. 2007-319361

(51) Int. Cl.
*H04L 12/26* (2006.01)
(52) U.S. Cl.
USPC ........................................ 370/241; 379/88.18
(58) Field of Classification Search
None
See application file for complete search history.

(56) References Cited

U.S. PATENT DOCUMENTS

| 8,054,960 B1* | 11/2011 | Gunasekara | 379/201.12 |
| 2006/0165059 A1* | 7/2006 | Batni et al. | 370/352 |
| 2007/0263598 A1* | 11/2007 | Chen et al. | 370/352 |
| 2008/0261592 A1* | 10/2008 | Finizole E Silva et al. | 455/435.1 |

FOREIGN PATENT DOCUMENTS

| JP | 04-111658 | 4/1992 |
| JP | 09-307637 | 11/1997 |
| JP | 2007-515854 | 6/2007 |
| JP | 2007-243385 | 9/2007 |

* cited by examiner

*Primary Examiner* — Yemane Mesfin
*Assistant Examiner* — Khoa Huynh
(74) *Attorney, Agent, or Firm* — Young & Thompson (57) ABSTRACT

A guidance confirmation apparatus includes a pseudo terminal which belongs to an IMS network including a CSCF server which performs call/connection processing of an SIP terminal, an HSS server which permits use of a registered SIP terminal in the IMS network, and an MRF system which includes sound sources for generating various kinds of guidance. Upon receiving a test connection command to instruct a guidance connection test from the SIP terminal, the pseudo terminal is registered in the HSS server as a virtual terminal usable in the IMS network and connects the SIP terminal to a sound source corresponding to a guidance number based on the test connection command. A guidance confirmation method is also disclosed.

10 Claims, 6 Drawing Sheets

GUIDANCE CONFIRMATION APPARATUS AND METHOD

This application is based upon and claims the benefit of priority from Japanese patent application No. 2007-319361, filed on Dec. 11, 2007, the disclosure of which is incorporated herein in its entirety by reference.

BACKGROUND OF THE INVENTION

The present invention relates to a guidance confirmation apparatus and method of confirming various kinds of guidance prepared in an IMS (IP Multimedia Subsystem) network.

Related arts of a guidance confirmation apparatus of this type are apparatuses or systems disclosed in reference 1 (Japanese Patent Laid-Open No. 2007-243385), reference 2 (Japanese Patent Laid-Open No. 4-111658), reference 3 (Japanese Patent Laid-Open No. 9-307637), and reference 4 (Japanese Laid-Open Patent No. 2007-515854).

In the apparatus disclosed in reference 1, when a telephone terminal status reception unit receives a failure notification of a telephone terminal from a monitoring device, the call of a client telephone connected to the telephone terminal is transferred to a guidance sending terminal. The guidance sending terminal sends a guidance announcement to the client telephone of the transfer source.

The system disclosed in reference 2 connects the calling end to an automatic answering testing device if the receiving side is not connectable. The connected automatic answering testing device returns, to the calling end, an immediate message representing the reason why the destination side is not obtainable at the time of origination. Hence, the calling end can acquire the immediate message representing the reason why the destination side is not obtainable without any complex answering test.

In the system disclosed in reference 3, a local exchange receives a temporary response signal to an ID reception terminal activation signal and sends a test code (origination telephone number information for test) to the ID reception terminal in place of origination telephone number information which should be sent to the ID reception terminal. The ID reception terminal confirms the test code and returns the information back to the local exchange. The test board of the local exchange collates the sent origination telephone number information for test with the returned information, thereby performing loop-back confirmation.

In the system disclosed in reference 4, when a user terminal device UE transmits a registration message to an IMS network, the IMS network authenticates the user terminal device UE and transmits an acknowledge OK to it. Then, proper data exchange starts between the user terminal device UE and the IMS network.

However, the above-described related arts do not allow a maintenance person to, e.g., easily confirm whether various kinds of guidance prepared in the IMS network are correct or not.

SUMMARY OF THE INVENTION

An exemplary object of the invention is to make it possible to easily confirm, using a simple arrangement, whether various kinds of guidance prepared in an IMS network are correct or not.

A guidance confirmation apparatus according to an exemplary aspect of the invention includes a pseudo terminal which belongs to an IMS network including a CSCF server which performs call/connection processing of an SIP terminal, an HSS server which permits use of a registered SIP terminal in the IMS network, and an MRF system which includes sound sources for generating various kinds of guidance, and upon receiving a test connection command to instruct a guidance connection test from the SIP terminal, is registered in the HSS server as a virtual terminal usable in the IMS network and connects the SIP terminal to a sound source corresponding to a guidance number based on the test connection command.

A guidance confirmation method according to another exemplary aspect of the invention includes the steps of generating a pseudo terminal in an IMS network when a test connection command to instruct a guidance connection test is transmitted from an SIP terminal accommodated in the IMS network, the IMS network including a CSCF server which performs call/connection processing of the SIP terminal, an HSS server which permits use of a registered SIP terminal in the IMS network, and an MRF system which includes sound sources for generating various kinds of guidance, registering the pseudo terminal in the HSS server as a virtual terminal usable in the IMS network, and causing the pseudo terminal to connect the SIP terminal to a sound source corresponding to a guidance number based on the test connection command.

EXEMPLARY EMBODIMENTS

The exemplary embodiments of the present invention will now be described in detail with reference to the accompanying drawings.

First Exemplary Embodiment

Figure 1:
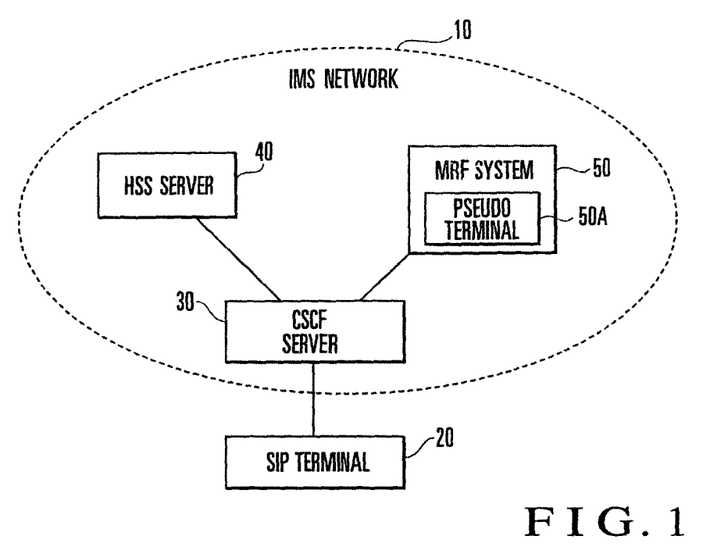
FIG. 1 is a block diagram showing the arrangement of an IMS network system to which the first exemplary embodiment of the present invention is applied.

FIG. 1 shows the arrangement of an IMS network system to which the first exemplary embodiment of the present invention is applied. This system includes an IMS network 10, and an SIP (Session Initiation Protocol) terminal 20 accommodated in the IMS network 10, as shown in FIG. 1.

The IMS network 10 includes a CSCF (Call Session Control Function) server 30, an HSS (Home Subscriber Server) server 40, and an MRF (Multimedia Resource Function) system 50. The CSCF server 30 is a call/connection processing apparatus which executes call/connection processing of the SIP terminal 20 in an area provided by a carrier that has a contract with the SIP terminal 20. The HSS server 40 is a registration apparatus which stores subscription information of a user and registers the SIP terminal 20 of the user. The HSS server 40 permits the use of the registered SIP terminal 20 in the IMS network 10. The MRF system 50 is a guidance providing apparatus for providing various kinds of guidance and includes a sound source for generating the various kinds of guidance.

In the IMS network 10, generally, the SIP terminal 20 performs registration processing to acquire a use permission. A registration signal is transmitted from the SIP terminal 20 to the HSS server 40 via the CSCF server 30 which performs call/connection processing. If the SIP terminal that has transmitted the registration signal is usable, the HSS server 40 returns a registration success response to the SIP terminal 20 via the CSCF server 30. Upon receiving the registration response, the SIP terminal 20 can originate a call.

The MRF system 50 conducts a guidance connection test in consideration of the registration processing of the IMS network. In this exemplary embodiment, when the SIP terminal 20 submits a test connection command for a guidance connection test to the MRF system 50 via the CSCF server 30, the MRF system 50 generates a pseudo terminal 50A (i.e., virtual terminal) that is a pseudo subscriber terminal and registers it in the HSS server 40. Normally, the HSS server 40 does not recognize the pseudo terminal 50A as a usable terminal. However, since the registration signal includes a test identifier to cause the HSS server 40 to recognize the pseudo terminal 50A as a test terminal, the registration succeeds.

After that, to perform the guidance connection test, the pseudo terminal 50A in the MRF system 50 originates a call to the SIP terminal 20 which should hear guidance. The pseudo terminal 50A executes the origination processing for a called number registered by the test connection command, like the normal SIP terminal 20. Upon receiving a response from the recipient (i.e., the user of the SIP terminal 20) corresponding to the called number, the pseudo terminal 50A performs guidance connection processing of connecting the recipient to one of sound sources representing various kinds of guidance prepared in the MRF system 50, which is determined by the test connection command, via the CSCF server 30. This makes the recipient hear the guidance in the MRF system 50 and confirm whether the guidance is correct or not.

Conventionally, the IMS network system has no choice but to directly confirm sound source files in the MRF system (MRF guidance system). However, this exemplary embodiment enables to confirm sound source files in the MRF system via the IMS network.

Figure 2:
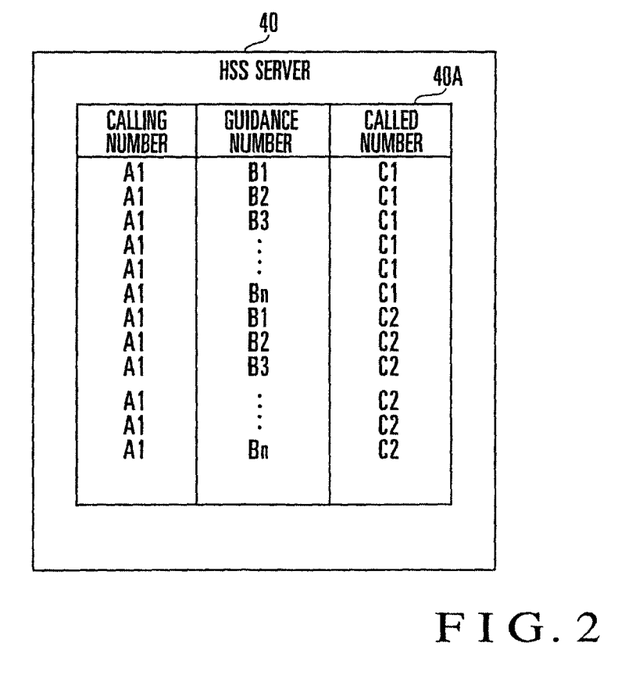
FIG. 2 is a view showing the registration state of a table provided in an HSS server.

Note that called numbers corresponding to recipients who should hear guidance and guidance numbers corresponding to various kinds of guidance are registered in a table 40A of the HSS server 40 shown in FIG. 2. This allows arbitrary designation via the test connection command and a guidance connection test having a high degree of freedom.

Figure 3:
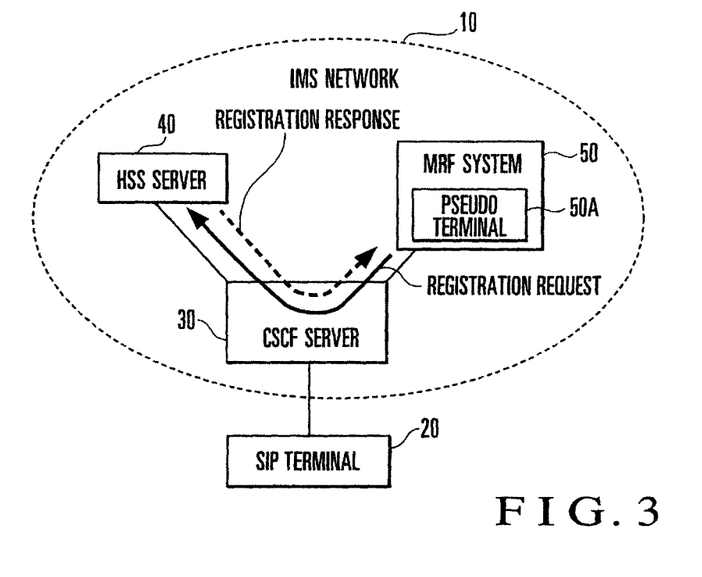
FIG. 3 is a view for explaining the flow of signals of registration processing in the IMS network.

FIG. 3 explains the flow of signals of registration processing in the IMS network 10. The flow of signals of registration processing in the IMS network will be described with reference to FIG. 3.

Upon receiving a test connection command, the MRF system 50 generates the pseudo terminal 50A and sends a registration request including a registration signal from the generated pseudo terminal 50A. The registration signal is transmitted to the HSS server 40 via the CSCF server 30 which executes call/connection processing. The HSS server 40 receives the registration signal and recognizes, based on the test identifier included in the registration signal, that the call is sent from the pseudo terminal 50A. Consequently, the HSS server 40 transmits a normal registration response to the pseudo terminal 50A via the CSCF server 30. From then on, origination from the pseudo terminal 50A is permitted.

Figure 4:
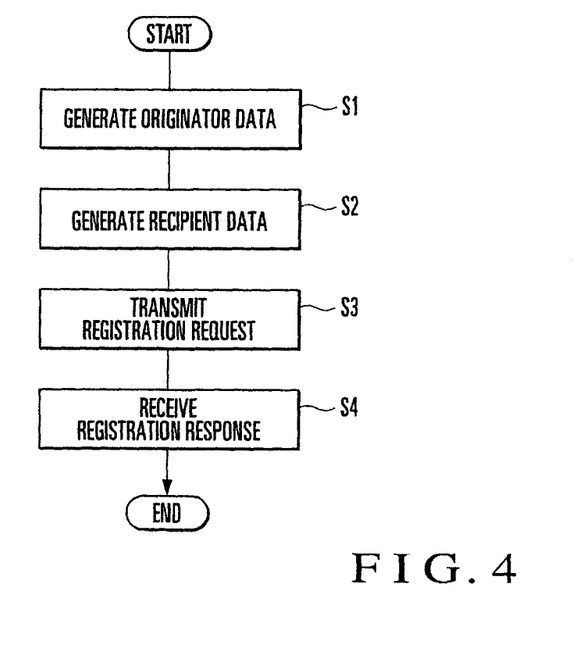
FIG. 4 is a flowchart illustrating an operation of registering a pseudo terminal provided in an MRF sys in the IMS network.

The operation of registering the pseudo terminal in the MRF system 50 will be described in more detail with reference to the flowchart in FIG. 4.

Upon receiving a test connection command, the MRF system 50 generates the pseudo terminal 50A. The SIP terminal 20 sends a registration instruction to the MRF system 50 via the CSCF server 30 by a test connection command. Simultaneously, the SIP terminal 20 sequentially inputs, to the MRF system 50, an calling number representing the number of the pseudo terminal 50A, a called number representing the number of the SIP terminal which should hear guidance, and a guidance number to select a sound source to generate guidance to be confirmed.

The pseudo terminal 50A in the MRF system 50 generates and stores subscriber data (originator data such as the received calling number) of the pseudo terminal 50A necessary for registration (step S1). The MRF system 50 generates and stores a called number and a guidance number which are recipient data necessary for origination (step S2).

The pseudo terminal 50A sends a registration request by generating a registration signal based on the generated subscriber data (originator data) and recipient data and transmitting the registration signal containing a test identifier (step S3). The registration request is sent to the HSS server 40 via the CSCF server 30 and registered as the calling number, called number, and guidance number in the table 40A of the HSS server 40 shown in FIG. 2. The HSS server 40 registers them and returns a response to the registration signal. The pseudo terminal 50A in the MRF system 50 receives the returned response to the registration signal via the CSCF server 30 (step S4). The registration processing is thus ended. From then on, origination from the pseudo terminal 50A or reception by the pseudo terminal 50A is permitted.

Figure 5:
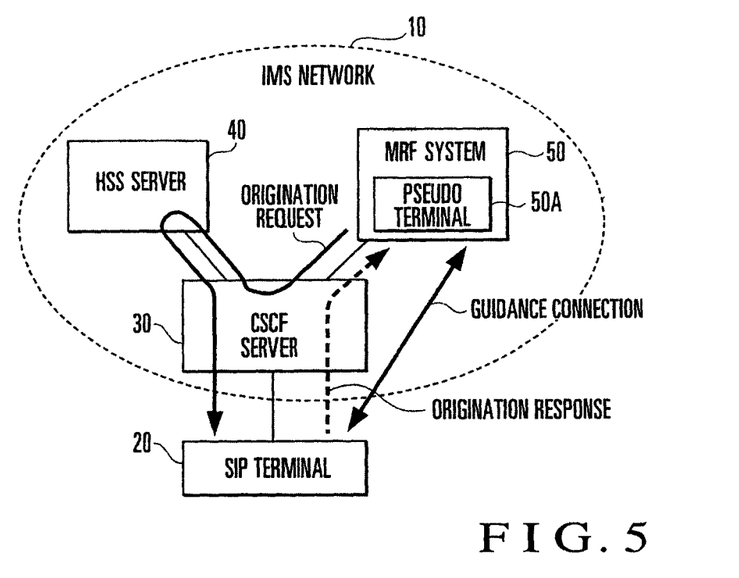
FIG. 5 is a view for explaining the flow of signals of origination processing from the pseudo terminal in the IMS network.

FIG. 5 explains the flow of signals of origination processing from the pseudo terminal 50A in the IMS network. The flow of signals of origination processing from the pseudo terminal 50A will be described with reference to FIG. 5.

After the above-described registration processing of registering the pseudo terminal 50A based on a registration instruction by a test connection command from the SIP terminal 20, the pseudo terminal 50A in the MRF system 50 issues an origination request including transmission of an origination signal on the basis of a guidance connection start instruction by a test connection command from the SIP terminal 20. The origination signal is transmitted to the CSCF server 30 which performs call/connection processing. In this case, the CSCF server 30 transmits a recipient's subscriber information acquisition request to the HSS server 40 and receives the recipient's subscriber information from the HSS server 40. Next, the CSCF server 30 transmits the origination signal to the SIP terminal 20 as the subscriber based on the recipient's subscriber information. The origination signal is thus transmitted to the SIP terminal 20.

Upon receiving the transmitted origination signal, the SIP terminal 20 as the called terminal returns an origination response representing the response to the origination signal. The origination response is sent to the pseudo terminal 50A in the MRF system 50 via the CSCF server 30. Upon receiving the origination response, the pseudo terminal 50A performs guidance connection processing of connecting, via the CSCF server 30, the SIP terminal 20 to a sound source determined by the test connection command, thereby causing the user of the SIP terminal 20 to hear guidance.

Figure 6:
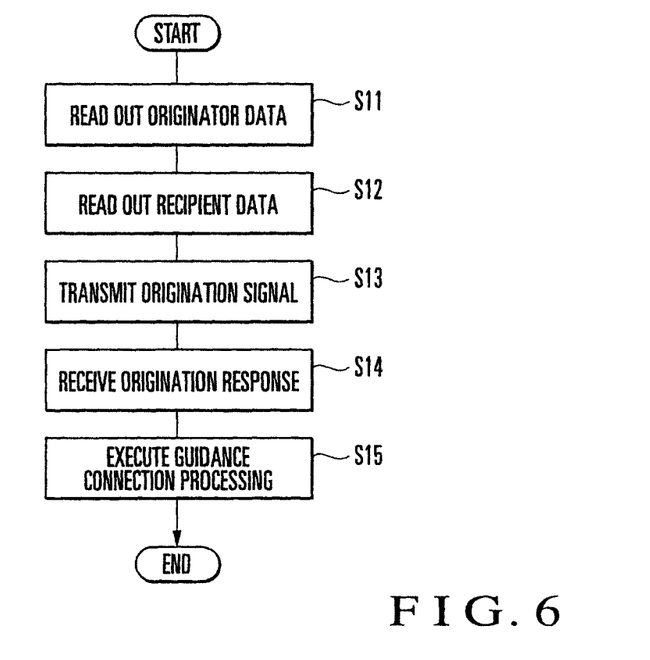
FIG. 6 is a flowchart illustrating a guidance connection operation based on origination from the pseudo terminal.

FIG. 6 illustrates the guidance connection operation based on origination from the pseudo terminal 50A in the MRF system 50. The guidance connection processing based on origination from the pseudo terminal 50A will be described in more detail with reference to the flowchart.

After the registration processing of registering the pseudo terminal 50A based on a registration instruction by a test connection command from the SIP terminal 20, a guidance connection start instruction by a test connection command is input to the MRF system 50. The pseudo terminal 50A in the MRF system 50 issues an origination request including transmission of an origination signal. The origination signal is transmitted to the CSCF server 30 which performs call/connection processing. In this case, the CSCF server 30 instructs the HSS server 40 to read out originator data (calling number) already registered in the HSS server 40 by the registration processing in FIG. 4 (step S11), and recipient data (called number) including a guidance number (step S12).

The recipient is determined based on the readout recipient data. The origination signal including the originator data and the guidance number is transmitted to the recipient (i.e., SIP terminal 20) (step S13). Upon receiving the transmitted origination signal, the SIP terminal 20 as the called terminal returns an origination response representing the response to the origination signal. The origination response is sent to the pseudo terminal 50A in the MRF system 50 via the CSCF server 30 so that the pseudo terminal 50A receives it (step S14). Upon receiving the origination response, the pseudo terminal 50A performs guidance connection processing of connecting, via the CSCF server 30, the SIP terminal 20 as the called terminal to a sound source determined by the guidance number in the test connection command, thereby causing the user of the SIP terminal 20 to hear guidance corresponding to the connected sound source (step S15).

Figure 7:
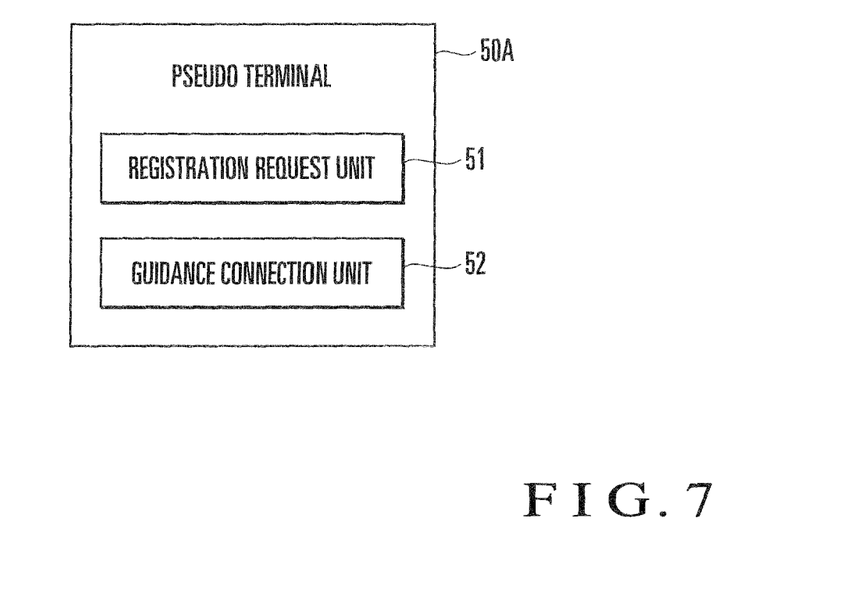
FIG. 7 is a functional block diagram of the pseudo terminal.

FIG. 7 shows the pseudo terminal 50A in the MRF system 50. The pseudo terminal 50A includes a registration request unit 51 and a guidance connection unit 52.

The registration request unit 51 transmits, to the HSS server 40, a registration signal including the number of the pseudo terminal 50A and a test identifier representing a connection test to request the HSS server 40 to permit the use in the IMS network 10. The registration request unit 51 performs, e.g., the processes in steps S1 to S4 of FIG. 4.

The guidance connection unit 52 connects the SIP terminal 20 to a sound source in accordance with an origination request from the pseudo terminal 50A based on a guidance connection start instruction included in a test connection command. The guidance connection unit 52 performs, e.g., the processes in steps S14 and S15 of FIG. 6.

Figure 8:
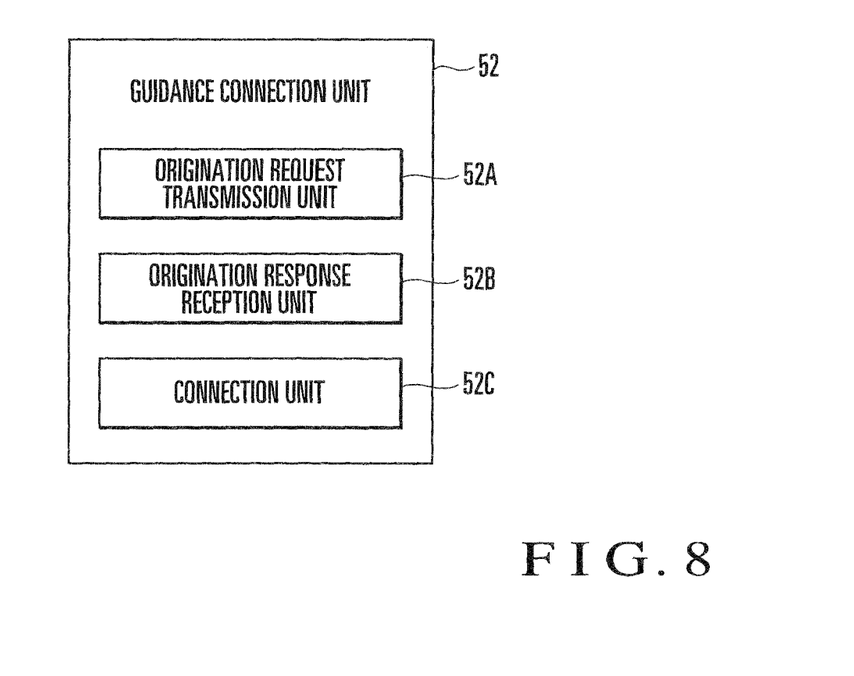
FIG. 8 is a functional block diagram of a guidance connection unit.

FIG. 8 shows the guidance connection unit 52. The guidance connection unit 52 includes an origination request transmission unit 52A, origination response reception unit 52B, and connection unit 52C.

The origination request transmission unit 52A transmits an origination request to the SIP terminal 20 corresponding to the called number registered in the HSS server 40. Transmission of an origination request indicates not only origination signal transmission from the pseudo terminal 50A to the CSCF server 30 but also origination signal transmission from the CSCF server 30 to the SIP terminal 20, including the above-described processing in the CSCF server 30.

The origination response reception unit 52B receives an origination response transmitted from the SIP terminal 20. The origination response reception unit 52B performs, e.g., the process in step S14 of FIG. 6.

Upon receiving the origination response, the connection unit 52C connects a sound source corresponding to the guidance number to the SIP terminal 20. The guidance number is registered in the HSS server 40 in association with the called number. The connection unit 52C performs, e.g., the process in step S15 of FIG. 6.

Second Exemplary Embodiment

Figure 9:
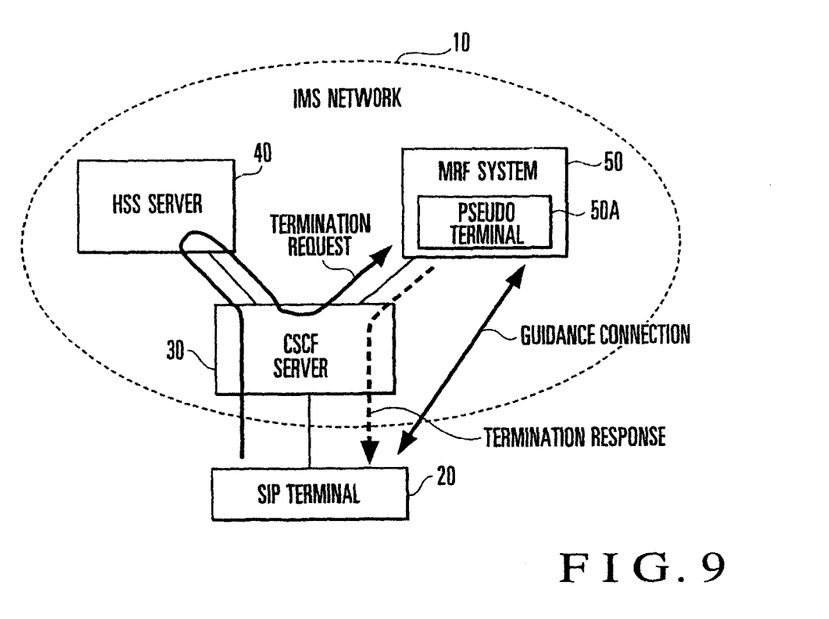
FIG. 9 is a view for explaining guidance connection according to the second exemplary embodiment.

FIG. 9 explains guidance connection according to the second exemplary embodiment. Guidance connection according to the second exemplary embodiment will be described with reference to FIG. 9.

After registration processing of registering a pseudo terminal 50A based on a registration instruction by a test connection command from an SIP terminal 20, the SIP terminal 20 outputs a test connection command including a termination signal as a termination request. The termination signal is transmitted to a CSCF server 30 which performs call/connection processing. In this case, the CSCF server 30 transmits a recipient's subscriber information acquisition request to an HSS server 40 and receives, from the HSS server 40, the recipient's subscriber information including a called number which is the number of the terminal (i.e., SIP terminal 20) as the termination request transmission source, and an calling number and guidance number corresponding to the called number. Next, the CSCF server 30 transmits a test connection command including the called number and the guidance number to the pseudo terminal 50A in an MRF system 50 as the termination request. The termination request is thus sent to the pseudo terminal 50A.

Upon receiving the termination request, the pseudo terminal 50A as the called terminal returns a termination response representing the response to the termination request. The pseudo terminal 50A performs guidance connection processing of connecting the SIP terminal 20 to a sound source determined based on the guidance number included in the received termination request via the CSCF server 30, thereby causing the user of the SIP terminal 20 to hear guidance.

Figure 10:
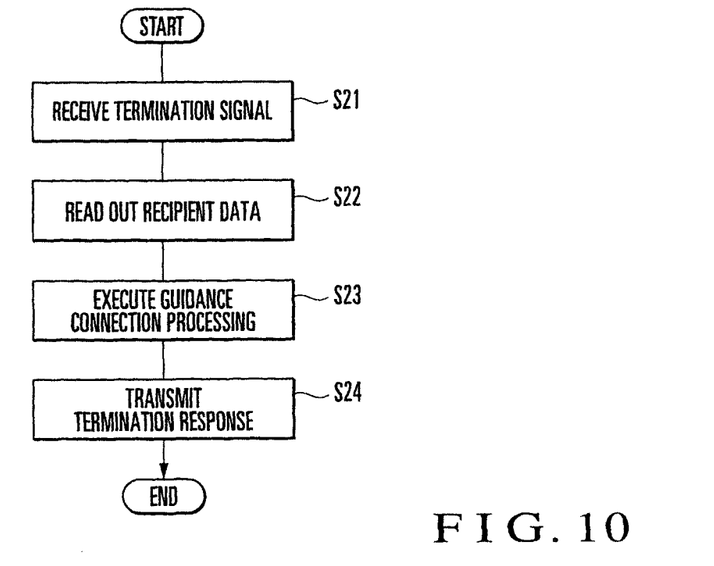
FIG. 10 is a flowchart illustrating an operation example of guidance connection according to the second exemplary embodiment.

An operation example of guidance connection according to the second exemplary embodiment will be described next in more detail with reference to the flowchart in FIG. 10.

After registration processing of registering the pseudo terminal 50A based on a registration instruction by a test connection command from the SIP terminal 20, the SIP terminal 20 outputs a test connection command including a termination signal as a termination request. The termination signal is transmitted to the CSCF server 30 which performs call/connection processing so that the CSCF server 30 receives it (step S21). In this case, the CSCF server 30 transmits a recipient's subscriber information acquisition request to the HSS server 40. The HSS server 40 reads out a called number which is the number of the terminal (i.e., SIP terminal 20) as the termination request transmission source, and an calling number and guidance number corresponding to the called number, which are registered in the HSS server 40, as the recipient's subscriber information (recipient data) (step S22), and transmits it to the CSCF server 30.

Upon receiving the recipient's subscriber information, the CSCF server 30 transmits, as the termination request, a test connection command including the called number and the guidance number to the pseudo terminal 50A in the MRF system 50 based on the received recipient's subscriber information. Upon receiving the termination request, the pseudo terminal 50A as the called terminal in the MRF system 50 performs guidance connection processing of connecting the terminal (i.e., SIP terminal 20) corresponding to the called number included in the test connection command to a sound source determined based on the guidance number included in the termination request via the CSCF server 30, thereby causing the user of the SIP terminal 20 to hear guidance corresponding to the sound source (step S23). In this case, the pseudo terminal 50A also returns a termination response representing the response to the received termination request (step S24).

The pseudo terminal 50A of this exemplary embodiment also includes a registration request unit 51 and a guidance connection unit 52. However, the guidance connection unit 52 connects the SIP terminal 20 to a sound source in accordance with a termination request from the SIP terminal 20 based on a guidance connection start instruction included in a test connection command. The guidance connection unit 52 performs, e.g., the processes in steps S23 and S24 of FIG. 10.

The guidance connection unit 52 of this exemplary embodiment includes a connection unit 52C. However, neither an origination request transmission unit 52A nor an origination response reception unit 52B is necessary, unlike the guidance connection unit 52 of the first exemplary embodiment. Upon receiving a termination request, the connection unit 52C connects a sound source corresponding to the guidance number to the SIP terminal 20 corresponding to the called number registered in the HSS server 40. The guidance number is registered in the HSS server 40 in association with the called number. The connection unit 52C performs, e.g., the process in step S23 of FIG. 10.

Third Exemplary Embodiment

Figure 11:
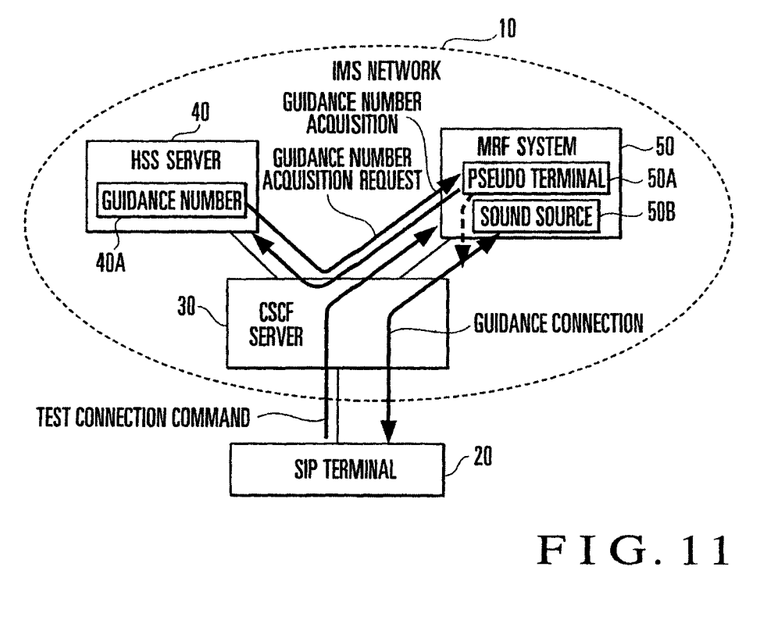
FIG. 11 is a view for explaining guidance connection according to the third exemplary embodiment.

FIG. 11 explains guidance connection according to the third exemplary embodiment in correspondence with claims 1 and 5. Guidance connection according to the third exemplary embodiment will be described with reference to FIG. 11.

When an SIP terminal 20 submits a test connection command to instruct a guidance connection test, the test connection command is sent to an MRF system 50 via a CSCF server 30. In this case, the MRF system 50 generates a pseudo terminal 50A as a virtual terminal, as described above. The MRF system 50 causes the pseudo terminal 50A to transmit a registration request to an HSS server 40 based on a registration instruction by a test connection command so that the use of the pseudo terminal 50A in an IMS network 10 is permitted from then on, and guidance numbers to select various kind of guidance are registered in a table 40A of the HSS server 40.

When a guidance connection start instruction by a test connection command is input, the pseudo terminal 50A performs guidance connection processing of acquiring a guidance number registered in the table 40A of the HSS server 40, selecting a sound source 50B corresponding to the acquired guidance number from sound sources that generate various kinds of guidance prepared in the MRF system 50, and connecting the SIP terminal 20 to the selected sound source 50B.

In the above-described exemplary embodiment, the pseudo terminal 50A is generated in accordance with the submission of a test connection command that instructs a guidance connection test. The pseudo terminal 50A is registered in the HSS server 40 as a virtual terminal usable in the IMS network 10 together with a guidance number. The pseudo terminal 50A connects the SIP terminal 20 to the sound source 50B corresponding to the guidance number based on the test connection command. This makes it possible to cause, by a simple arrangement, a maintenance person to hear various kinds of guidance prepared in the IMS network 10 and confirm whether they are correct or not.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A guidance confirmation apparatus for confirming a guidance provided by an IP Multimedia Subsystem network including a Call Session Control Function server which performs call/connection processing of a Session Initiation Protocol (SIP) terminal, a Home Subscriber server which permits use of a registered Session Initiation Protocol terminal in the IP Multimedia Subsystem network, and a Multimedia Resource Function system which includes sound sources for generating plural kinds of guidance, comprising:

a hardware unit providing a pseudo terminal which, upon receiving from the Session Initiation Protocol terminal a test connection command that instructs a guidance connection test, i) generates a virtual terminal usable in the IP Multimedia Subsystem network and registered in the Home Subscriber server together with a guidance number, and ii) processes the guidance connection test by connecting the Session Initiation Protocol terminal to a sound source corresponding to the guidance number based on the test connection command, wherein said guidance confirmation apparatus confirms the guidance provided by the IP Multimedia Subsystem network including the Call Session Control Function server which performs call/connection processing of the Session Initiation Protocol terminal, the Home Subscriber server which permits use of the registered Session Initiation Protocol terminal in the IP Multimedia Subsystem network, and the Multimedia Resource Function system which includes sound sources for generating plural kinds of guidance, and a number of said virtual terminal and a number of the Session Initiation Protocol (SIP) terminal are registered in the Home Subscriber server in association with the guidance number.

2. An apparatus according to claim 1, wherein said virtual terminal comprises a registration request unit which transmits, to the Home Subscriber server, a registration signal including a number of said virtual terminal and a test identifier representing the connection test to request a use permission in the IP Multimedia Subsystem network of the Home Subscriber server.

3. An apparatus according to claim 1, wherein, said virtual terminal comprises a guidance connection unit which connects the Session Initiation Protocol (SIP) terminal to the sound source in accordance with one of an origination request of said virtual terminal and a termination request from the Session Initiation Protocol (SIP) terminal based on a guidance connection start instruction included in the test connection command.

4. An apparatus according to claim 3, wherein,
said guidance connection unit comprises:
an origination request transmission unit which transmits the origination request to the Session Initiation Protocol (SIP) terminal of the number registered in the Home Subscriber server;

an origination response reception unit which receives an origination response transmitted from the Session Initiation Protocol (SIP) terminal as a response to the origination request; and a connection unit which connects the sound source corresponding to the guidance number registered in the Home Subscriber server to the Session Initiation Protocol (SIP) terminal upon receiving the origination response.

5. An apparatus according to claim 3, wherein, said guidance connection unit comprises a connection unit which connects the sound source corresponding to the guidance number registered in the Home Subscriber server to the Session Initiation Protocol (SIP) terminal of the number registered in the Home Subscriber server when the termination request is transmitted to said virtual terminal of the number registered in the Home Subscriber server.

6. A guidance confirmation method comprising the steps of:

in an IP Multimedia Subsystem network including a Call Session Control Function server which performs call/connection processing of a Session Initiation Protocol terminal, a Home Subscriber server which permits use of a registered Session Initiation Protocol (SIP) terminal in the IP Multimedia Subsystem network, and a Multimedia Resource Function system which includes sound sources for generating plural kinds of guidance, generating a pseudo terminal which, upon receiving from the Session Initiation Protocol terminal a test connection command that instructs a guidance connection test, generates a virtual terminal usable in the IP Multimedia Subsystem network;

registering the virtual terminal in the Home Subscriber server together with a guidance number; and causing the virtual terminal to process the guidance connection test by connecting the Session Initiation Protocol terminal to a sound source corresponding to the guidance number based on the test connection command, wherein a number of said virtual terminal and a number of the Session Initiation Protocol (SIP) terminal are registered in the Home Subscriber server in association with the guidance number.

7. A method according to claim 6, wherein, the step of registering the virtual terminal comprises the step of transmitting, to the Home Subscriber server, a registration signal including a number of the virtual terminal and a test identifier representing the connection test to request a permission of the use of the virtual terminal in the IP Multimedia Subsystem network of the Home Subscriber server.

8. A method according to claim 6, wherein, the step of connecting the Session Initiation Protocol (SIP) terminal to the sound source comprises the step of connecting the Session Initiation Protocol (SIP) terminal to the sound source in accordance with one of an origination request of the virtual terminal and a termination request from the Session Initiation Protocol (SIP) terminal based on a guidance connection start instruction included in the test connection command.

9. A method according to claim 8, wherein, the step of registering the virtual terminal comprises the step of registering a number of the virtual terminal and a number of the Session Initiation Protocol (SIP) terminal in the Home Subscriber server in association with the guidance number, and the step of connecting the Session Initiation Protocol (SIP) terminal to the sound source in accordance with the request comprises the steps of:

transmitting the origination request to the Session Initiation Protocol (SIP) terminal of the number registered in the Home Subscriber server upon receiving the origination request from the virtual terminal;

receiving an origination response transmitted from the Session Initiation Protocol (SIP) terminal as a response to the origination request; and connecting the sound source corresponding to the guidance number registered in the Home Subscriber server to the Session Initiation Protocol (SIP) terminal upon receiving the origination response.

10. A method according to claim 8, wherein, the step of registering the virtual terminal comprises the step of registering a number of the virtual terminal and a number of the Session Initiation Protocol (SIP) terminal in the Home Subscriber server in association with the guidance number, and the step of connecting the Session Initiation Protocol (SIP) terminal to the sound source in accordance with the request comprises the step of connecting the sound source corresponding to the guidance number registered in the Home Subscriber server to the Session Initiation Protocol (SIP) terminal of the number registered in the Home Subscriber server when the termination request is transmitted to the virtual terminal of the number registered in the Home Subscriber server.

\* \* \* \* \*